United States Patent
Basfar et al.

(10) Patent No.: US 8,263,674 B2
(45) Date of Patent: Sep. 11, 2012

(54) ECO FRIENDLY CROSSLINKED FLAME RETARDANT COMPOSITION FOR WIRE AND CABLE

(75) Inventors: Ahmed Ali Basfar, Riyadh (SA); Patrick Noireaux, Le Mans (FR); Arnaud Coudreuse, Le Mans (FR); Roxane Noblat, Le Mans (FR)

(73) Assignee: King Abdulaziz City for Science and Technology "KACST", Riyadh (SA)

( * ) Notice: Subject to any disclaimer, the term of this patent is extended or adjusted under 35 U.S.C. 154(b) by 15 days.

(21) Appl. No.: 13/189,731

(22) Filed: Jul. 25, 2011

(65) Prior Publication Data

US 2011/0278039 A1   Nov. 17, 2011

(51) Int. Cl.
*B29C 71/04* (2006.01)
*C08K 3/22* (2006.01)

(52) U.S. Cl. ............ 522/83; 522/111; 522/112; 524/433
(58) Field of Classification Search ............ 522/71, 522/83, 111, 112, 149; 524/433
See application file for complete search history.

(56) References Cited

U.S. PATENT DOCUMENTS

| | | | | |
|---|---|---|---|---|
| 4,769,179 A * | 9/1988 | Kato et al. | ...................... | 252/609 |
| 5,118,748 A * | 6/1992 | Fujita et al. | ...................... | 524/436 |
| 5,218,027 A * | 6/1993 | Smith et al. | ...................... | 524/265 |
| 5,378,539 A * | 1/1995 | Chen | .............. | 428/378 |
| 5,473,007 A | 12/1995 | Kwan et al. | | |
| 5,698,323 A * | 12/1997 | Keough et al. | ................ | 428/379 |
| 6,043,312 A | 3/2000 | Fagher et al. | | |
| 6,277,908 B1 * | 8/2001 | Yamamoto | ..................... | 524/436 |
| 6,287,692 B1 | 9/2001 | Luo et al. | | |
| 2007/0155883 A1 | 7/2007 | Sato et al. | | |
| 2008/0251273 A1 | 10/2008 | Brown et al. | | |
| 2009/0020311 A1 | 1/2009 | Park et al. | | |
| 2011/0180301 A1 * | 7/2011 | Basfar et al. | ............ | 174/110 SR |

FOREIGN PATENT DOCUMENTS

WO   WO 2009119942 A1 *  10/2009

OTHER PUBLICATIONS

Crompton (Silquest A-172 Silane. Apr. 2002, 4 pages).*
Hui Liu et al., The effectsofirradiationcross-linkingonthethermaldegradation and flame-retardantpropertiesoftheHDPE/EVA/magnesium hydroxidecomposites, Radiation Physics and Chemistry, 78(2009) pp. 922-926.
Chen et al., A review on flame retardant technology in China. Part I: development of flame retardants, Polym. Adv. Technol. 2010, 21 1-26.

* cited by examiner

*Primary Examiner* — Ling Choi
*Assistant Examiner* — Brieann R Fink
(74) *Attorney, Agent, or Firm* — Geeta Kadambi; Riddhi IP LLC

(57) ABSTRACT

An eco friendly radiation cross-linked composition is described that demonstrates excellent resistance to fire and high temperature along with good mechanical properties. The composition which is based on a blend of EVA with a LLDPE, is free of monomer such as vinyl co-agent for radiation cross-linking. The halogen free flame retardant composition is a mixture of 20 to 90% by weight of magnesium hydroxide (powder A) and 90% to 20% of powder B. Preferably the powder B is a double salt of magnesium carbonate and calcium carbonate and the magnesium hydroxide has a specific surface treatment. In addition, 0.5 to 5 parts of flame retardancy agents are selected from talc, zinc borate or molybdate derivative. The chemicals used here reduce toxicity in the environment and do not release toxic chemicals to air and soil during fire. The flame retardant cross-linked polyolefin composition is particularly useful for insulating wires and cables.

8 Claims, No Drawings

ECO FRIENDLY CROSSLINKED FLAME RETARDANT COMPOSITION FOR WIRE AND CABLE

FIELD OF INVENTION

This disclosure generally relates to a non toxic, halogen free, eco friendly flame retardant insulation composition for enhancing thermal stability and flame retardancy in wire and cable. More particularly, this invention relates to a green flame retardant insulation composition which is cross-linked using an electron beam.

BACKGROUND

Wire and cable insulations must meet both electrical properties and mechanical properties requirements. Long term exposure to high temperature cause deterioration in the physical properties of the insulation material. Polyethylene and polyvinylchloride compounds are some of the best materials for wire and cable insulations because of their excellent electrical and mechanical properties. However, these materials have major weaknesses due to their lack of flame retardancy and high generation of toxic gases.

Currently, fire resistance is obtained by using high level of mineral fillers (more than 140 phr). Halogenated resin such as polyvinylchloride (PVC) which have good fire resistance can also be used.

The excellent initial mechanical properties of thermoplastics such as ethylene vinyl acetate copolymers (EVA) or low density polyethylene (LDPE) are degraded when the level of metal hydroxides is higher than 100 phr.

Heat resistance is achieved by either chemical cross-linking, or radiation cross-linking. In both cases, chemically or radiation cross-linking, co-agent which is potential Volatile Organic Compound (VOC) is used. In the case of fire, the VOC combustion contributes to air pollution. There is a need for eco friendly products to reduce air pollution.

Li Chen et al. (2010) in their review describe several flame retardant technologies that have been used for the last 15 years. In this review, they discuss halogen free flame retardants extensively including mineral fillers, inorganic nitrogen, phosphorous substances and miscellaneous systems; the role of cross-linking is not discussed.

The effects of radiation cross-linking on the thermal degradation and flame retardant properties of HDPE/EVA magnesium hydroxide composites is described in Hui Liu et al. (2009). The cross-linking is provided via high energy electron beam irradiation at high absorbed dose up to 250 kGy. An co-agent, triallyl isocyanurate (TAIL), is used to promote-radiation cross linking.

Park et al. (US 2009/0020311 A1) describes a composition for a cable-covering material used in railway vehicles. A base resin including ethylene-vinyl acetate copolymers and a mixture of metal hydroxide as halogen free flame retardants are disclosed. The composition according to the reference needs a minimum of three parts in weight of a cross-linking agent in order to satisfy resistance against dynamic pressure at high temperature. The preferred way for the chemical cross-linking is by using peroxide.

Brown et al. (US200802511273 A1) indicates that excellent aging properties are reached by using VLDPE (very low density polyethylene) or ULDPE (ultra low density polyethylene) as base polymers instead of ethylene vinyl acetate copolymer (EVA). This invention relates to a plenum cable with excellent aging, electrical properties. No thermal properties are described.

Sato et al. (US2008015883 A1) indicates that flexibility, workability and compatibility with mineral filler are obtained by a blend of various styrene-ethylene block copolymers. Cross-linking is needed by irradiation at low dose. In order to complete cross-linking at low dose, some auxiliary co-agents are used. For the zinc compounds in this present invention zinc sulphide or zinc sulphate are used. Specifically preferred is zinc sulphide.

Luo et al. (U.S. Pat. No. 6,287,692) describes a composition of high density polyethylene (HDPE). As additive, an ethylene vinyl acetate copolymer (EVA) with high level in VA of more than 40% is introduced in the blends with the HDPE. Co-agent such as TMPTMA (trimethylol propane trimethacrylate) is used. The main goal of this invention is to meet fuel resistance requirements as the invention is particularly used in automotive gas tanks.

Fagher et al. (U.S. Pat. No. 6,043,312) concerns thermoplastic compositions with various fire retardants based on mixtures of metallic hydroxide and zinc borate. The resin blends are based exclusively on polyvinyl chloride (PVC).

And finally, Kwon et al. (U.S. Pat. No. 5,473,007) discloses some blends of Ethylene vinyl acetate copolymers (EVA) with chlorinated polyolefin's. The chlorinated polyolefin's have excellent flame retardancy due to chlorine level, but they generate toxic gases. Antimony trioxides are used at low level. Chlorinated polyolefin's associated with antimony trioxide provide a huge amount of toxic gases, during combustion, but LOI values reach up to 45%. Monomers with trifunctional groups at high level (from 5 to 20 phr) are needed to gain good mechanical properties. Phosphorous content in these compositions also pollutes air and soil. There is a need for an improved eco friendly wire and cable insulation material.

SUMMARY

This invention relates to a composition and method of making electron beam cross-linked green eco friendly flame retardant insulation composition for wire and cable. In one embodiment, a unique composition for eco friendly flame retardant material for wire and cable is disclosed. In another embodiment, a cross-linkable thermoplastic insulating composition having flame retardancy UL94 V0 with limiting oxygen index (LOI) of more than 35%, high flexibility and excellent tensile strength is disclosed. In one embodiment, a composition that has superior performance when exposed to high temperature and prolonged thermal aging is disclosed.

In one embodiment, a thermoplastic composition for making the cross-linked eco friendly flame retardant insulation material for wire and cable is disclosed.

In one embodiment, electron beam cross-linking of the thermoplastic composition is performed without co-agents. In one embodiment, a compatibilizer (PEgMA) is used to improve dispersion of high contents of flame retardants in the composition. In another embodiment, ethylene vinyl acetate copolymer (EVA-28) and linear low density polyethylene homopolymer (LLDPE) are used. In one embodiment, a halogen free mineral compound for improving fire retardancy is used.

In one embodiment, two metal hydroxides are used in the composition to improve the mechanical performance and fire resistance. In another embodiment, a ratio of metal hydroxides which is less than 135 phr is used.

In one embodiment, organofunctional siloxane (Z-6173) as filler dispersion aid is used to improve the ability of blends for extrusion. Z-6173 contains alkoxy and alkyl functional groups which improve the dispersion of inorganic fillers such as into organic polymers.

In one embodiment, Charmax® or molybdate derivative was added in complement to metal hydroxide. In another embodiment, additives were synergistically used to achieve excellent flame retardancy and good mechanical properties. All these additives were used at low concentration of 10% or less than 5%. Talc and zinc borate were added for structuring the char.

In one embodiment, the composition is extruded after mixing and pelletizing. Once extruded, the cross-linking of the thermoplastic composition is performed using an electronic beam. In one embodiment the absorbed dose is between 75 kGy to 150 kGy. In a preferred embodiment, the absorbed dose is 125 kGy.

Electron beam cross-linked composition, using routine thermoplastic extruder/without co-agent is produced. The instant eco friendly flame retardant compositions are particularly suitable for use in enhanced cable insulations meeting most of thermosetting compounds standard requirements.

In one embodiment, a composition of a copolymer and a polymer, metallic hydrate, secondary fillers, compatibilizer and dispersant to make an eco friendly flame retardant insulation composition for wire and cable is disclosed. In one embodiment, electron beam cross-linked composition is made without using cross-linking agents such as volatile compounds (VOCs). In one embodiment, the extruded and cross-linked composition is thermally aged at 135° C. for seven days in an atmosphere containing air.

The composition and method disclosed herein may be implemented in any means for achieving various aspects, and may be executed to obtain green eco friendly flame retardant insulation composition for wire and cable. Other features will be apparent from the accompanying detailed description and examples that follows.

DETAILED DESCRIPTION

Several compositions and methods for making a technologically green and eco friendly flame retardant insulation for wire and cable are described herein. Although the present embodiments have been described with reference to specific example embodiments, it will be evident that various modifications and changes may be made to these embodiments without departing from the broader spirit and scope of the various embodiments.

The thermoplastic resin used, in the instant disclosure, may be selected out of various materials including high-density polyethylene, medium-density polyethylene, low-density polyethylene and linear low density polyethylene (LLDPE); copolymers of ethylene and C3-C12 alpha olefins and some copolymers of ethylene and polar group contained monomer like vinyl acetate.

Preferably, a blend of an EVA with low vinyl acetate content (25%) is selected for the instant purpose; and for the improvement of mechanical properties, an LLDPE polymer was used at low concentration. The blend of these materials allows relatively good compatibility with fillers but the thermal resistance of these blends is not high enough. In order to improve thermal resistance, the resin composition of the present example was cross-linked using an electron beam.

Conventionally in order to introduce cross-linking which improves the performance of wire and cable, organic peroxides such as dicumyl peroxide are used in complement with an co-agent such as triallyl isocyanurate or trimethylol propane trimethacrylate. Triallyl isocyanurate or trimethylol propane trimethacrylate are organic components that have a high volatility at the temperature of extrusion; and their toxicity is high. The instant composition was based on a specific ratio of EVA and LLDPE. Due to this specific ratio EVA/LLDPE, auxiliary agents such as vinyl or meth (acrylic) derivative are not required.

Once extruded and pelletized, the composition is then irradiated by electron beam to induce cross-linking. The absorbed dose employed in the irradiation process is chosen preferably above 75 kGy and below 150 kGy to minimize or prevent polymer degradation. Preferentially, an absorbed dose of 125 kGy is used to achieve both good fire retardancy and mechanical properties after thermal ageing.

Flame retardant fillers according to the present disclosure were selected such that they did not produce either corrosive or harmful gases; and these mineral fillers have moderate effect on initial mechanical properties.

Magnesium hydroxide is used and referred to as powder A. Ultracarb® which is a double salt of magnesium carbonate and calcium carbonate was used and referred to as powder B. In view of the good dispersibility in thermoplastic resin and the mechanical properties of the resulting resin composition, a particular magnesium hydroxide was selected. The surface treatment agents used may be selected out of various chemical agents including reactive agent like vinyl silane or non reactive agents like higher fatty acids such as stearic acid and oleic acid. In one embodiment, magnesium hydroxide with vinyl surface treatment (Magnifin® MH10A) and a magnesium hydroxide with stearic acid surface treatment (Kisuma®) were selected and used in various ratios. Powder of PTFE and dispersant Z 6173 improved the process ability of blends for extrusion.

A powder mixture of A and B was used in the present invention. The powder mixture according to the present invention as a preferred combination is magnesium hydroxide treated with vinyl silane or Magnifin® MH 10A which allows to gain high mechanical properties after thermal ageing. If Kisuma® with alkyl surface treatment is used in place of Magnifin® MH 10A, mechanical properties are lowered especially after thermal ageing.

The goal for the Hot Set test is to achieve an optimum range between 30% and 100%. The present invention demonstrates that using a magnesium hydroxide vinyl surface treated helps to reach a low value of 30%. Using Kisuma® alone which is alkyl surface treated leads to a high value of more than 100%. A mixture of Magnifin® MH10A and Ultracarb® helps achieve good values between 50-70%.

The optimum ratio between both mineral fillers was established, Magnifin® MH10A which allows increasing mechanical properties and Ultracarb® which leads to improved fire retardancy. If powder A level is less than 50%, tensile strength is lowered but if powder A exceeds more than 70% fire retardancy decreases.

Fire retardants were selected to meet the high temperature requirements for the blends. Zinc borate provides a synergistic effect on flame retardancy when used in combination with metal hydroxide such as magnesium hydroxide. Zinc borate, improves flame retardancy but also zinc borate acts as support to the carbonated layer of EVA-LLDPE.

In addition to the above critical ingredients, talc (grade V3837) and a molybdenum derivative with Charmax® AOM (ammonium octamolybdate) are added to the composition and both act as flame retardants.

Furthermore, the invention demonstrates that when all these fire retardants were added to the mixture of principal metallic hydrate based on magnesium and calcium, higher performances can be obtained.

All materials used for the examples are summarized in Table 1 below.

TABLE 1

Material list

| Function/Chemical Name | Material | Producer | Characteristics |
|---|---|---|---|
| Polymer, ethylene vinyl acetate (EVA) | Evaflex 360 | DuPont-Mitsui Polychemicals Co./Japan | vinyl acetate content: 25%, melt mass-flow rate (MFR) (190° C./2.16 kg): 2.0 g/10 min |
| Polymer, linear low density polyethylene (LLDPE) | LLDPE 118 | SABIC/Saudi Arabia | MFR 190° C./2.16 kg, melt flow index: 1.0 g/10 min |
| Compatibilizer PEgMA (HDPE) | Priex ® 11006 | Solvay | MFI = 6, MA grafted = 0.2% |
| Compatibilizer-LLDPEgMA E MB-226DE | Fusabond ® | Dupont | |
| Flame retardant, magnesium hydroxide, formula: $Mg(OH)_2$ | MAGNIFIN A Grades H10A | Albemarle/France | $Mg(OH)_2$ content: ≧99.8%, Modified with a vinyl silane surface treatment. Particle size: 0.6-1 μm, BET: 9-11 $m^2/g$ |
| Flame retardant, huntite hydromagnesite, formula: $Mg_3Ca(CO_3)_4$, $Mg_5(CO_3)_4(OH)_2\cdot 3H_2O$ | Ultracarb LH 15X | Minelco/USA | Decomposition temperature: 220° C. Specially treated for tensile and flame retardant properties |
| Flame retardant, magnesium hydroxide, formula: $Mg(OH)_2$ | KISUMA 5B | Mitsui/Japan | Particle size: 0.6-1 μm, Decomposition temperature: 340° C., BET: 4-7 $m^2/g$ |
| Thermal stabilizer-Polymerized 1,2-dihydro-2,2,4-trimethlyquinoline | Naugard ® Q | Uniroyal chemical | Amber powder or drop- Melting range: 85-105° C. |
| Talc, $Mg_3Si_4O_{10}(OH)_2$ | | Luzenac | Physical barrier to limit heat and mass transfer across char residue. BET 16 $m^2/g$ |
| Zinc Borate, $2ZnO_3B_2O_3\cdot 3.5H_2O$ | FireBrake ® | | White odourless powder, melting point 650° C. |
| Ammonium octamolybdate $NH_4\ 4\ Mo_8O_{26}$ | Charmax ® AOM | Polymer additives group | Melting range 85-105° C. |
| PTFE-polytertrafluoroethylene | | Adeka Palmarole | Promote charring effect |
| Filler dispersion aid- Z-6173 | | Dow Corning | Colourless liquid, BP 193° C. |

Method of Making:

The thermoplastic compositions of the present invention are produced according to blending, pelletizing and extrusion processes that are well known in the art. In this regard, the composition may be prepared by blending the proper amounts (in parts per hundred resins) of ethylene vinyl acetate copolymer (EVA-25) and LLDPE and compatibilizer. The specific amounts of metal hydroxide, talc, zinc borate or other mineral fillers are then added to the blend.

The compound was pelletized then reintroduced in the extruder to ensure good mixing. A flat die was used to obtain sheets of 2 mm thickness with 50 mm width. Sheets of 200×200 $mm^2$ were obtained by compression molding at 200° C.

Once extruded, the compound is then irradiated by electron beam to induce the cross-linking. Conventionally in order to introduce cross-linking which allows improving the performance of wire and cable, organic peroxides such as dicumyl peroxide are used with auxiliary agent such as triallyl isocyanurate or trimethylol propane trimethacrylate. The specific composition of the present invention was based on a particular ratio of EVA and LLDPE without any co-agent like organic peroxide or vinyl derivative.

The absorbed dose employed in the irradiation step is selected preferably above 75 kGy and below 150 kGy to minimize or prevent polymer degradation. Preferentially, an irradiation dose of 125 kGy will be used to obtain high performance of both fire retardancy and mechanical properties after thermal ageing. In addition, this absorbed dose of 125 kGy leads to an excellent Hot Set test as required by the specifications of wire and cable.

The cross-linked material is suitable for use in aggressive environment. These compositions are especially suitable for use in high temperature and allow it to reach the "Hot Set Test" (0.2 $MPa/mm^2$, 200° C., 15 minutes)). After cross-linking, the compositions exhibit a satisfactory retention of mechanical properties after thermal ageing for seven days at 135° C. under air.

TABLE 2A

| | Examples | | | | | | | | | |
|---|---|---|---|---|---|---|---|---|---|---|
| | 01 | 02 | 03 | 04 | 05 | 06 | 07 | 08 | 09 | 10 |
| EVA 360 | 90 | 90 | 90 | 90 | 90 | 90 | 90 | 90 | 90 | 90 |
| LDPE HP 118 W | 6 | 10 | 10 | 10 | 10 | 10 | 10 | 6 | 6 | 6 |
| LLDPEgMA (Fusabond ®) | 4 | | | | | | | 4 | | 4 |
| PEgMA Priex ® 11006 | | | | | | | | | 4 | |
| Naugard Q | 1.5 | 1.5 | 1.5 | 1.5 | 1.5 | 1.5 | 1.5 | 1.5 | 1.5 | 1.5 |
| Magnifin ® MH-10A | 70 | 60 | 70 | 60 | 55 | 50 | 70 | 70 | 70 | 70 |
| Ultracarb ® LH15X | 65 | 65 | 65 | 65 | 65 | 65 | 65 | 65 | 65 | 65 |
| KISUMA ® 5B | | | | | | | | | | |
| Charmax ® AOM | | 9 | 2 | 9 | 9 | 9 | 2 | 2 | 2 | |
| Talc V3837 | 2 | 2 | 2 | | | | 2 | 2 | 2 | 2 |
| ZnB | 5 | 5 | 5 | 5 | 5 | 5 | 5 | 5 | 5 | 5 |
| PTFE | | 0.5 | 0.5 | 0.5 | 0.5 | 0.5 | 0.5 | 0.5 | 0.5 | 0.5 |
| Dispersant Z6173 | | | | | | | 2 | 2 | 2 | 2 |

It was observed that the inventive cross-linked compositions surprisingly demonstrate high elongation at break around 200% at room temperature. It is well known to those skilled in the art, flame retardant compositions with level of mineral filler at 135 phr have very low elongation at break. Moreover, after thermal aging in an oven for 7 days at 135° C. under air, the retention of tensile properties is good. In addition, a range from 30% to 100% for the Hot Set Test (0.2 MPa/mm$^2$, 200° C. for 15 minutes) can be obtained. The flame retardant cross-linked composition is excellent in thermal resistance and flame retardancy compared to the conventional flame retardant compositions. The flame retardant compositions according to the present invention do not produce any toxic gases such as halogen gas when burned. These flame retardant cross-linked compositions are hence particularly useful for insulating flame retardant wire and cable and the like. Table 2A shows various combinations of materials used as examples.

Compounding and Cross-Linking:

Compounding: All formulations were prepared with a co-rotating twin screw extruder from TSA model FSCM 15.40 which is capable to mix and to compound up to 3 kg/hour of thermoplastic mixtures. The screw diameter is 15 mm and the screw length is 40 D (40×diameter=600 mm). All materials were dried before compounding. Air cooling was used in place of water cooling by dipping in order to prevent water absorption.

Moulding: With the die of the twin-screw extruder, it is not possible to have a sufficient width to prepare sheets for electrical and cone calorimeter measurements. That is why a mould is used. Dimensions are 20×20 cm in order to make on the same sample electrical measurements then cone calorimeter measurements. To obtain suitable sheets without bubbles or holes, the best conditions of moulding are 2 minutes at 200° C.

Cross-linking: EB cross-linking was performed at IONISOS Irradiation Service Co. in France with a unit of 10 MeV. The doses are provided by successive passes of 25 kGy under air atmosphere for various doses of 75, 100, 125 kGy.

Tests: The samples tested are un-irradiated (0 kGy) and irradiated samples (75-100-125 kGy). The details of the various tests are presented next.

For mechanical properties: Tensile strength and elongation at break were performed using a Lhomargy dynamometer on a tensile mode, according to the standard NFT 51.034. These measurements were obtained at a speed of 50 mm/min. For each reference, five tests are carried out. The standard deviation is provided by the software. Elongation is measured by a laser extensometer.

Mechanical properties after ageing: The samples were left in an oven for 7 days at 135° C. under air. The mechanical tests were performed according to the same procedure that was previously described before ageing.

TGA (Thermo Gravimetric Analysis): The apparatus used is a TGA Pyris® 1 from Perkin Elmer Co., USA. The samples are subjected to a temperature scan up to 800° C. at a speed of 10° C./min, under oxygen. The 50% weight loss temperature is read. The common standard deviation on homogeneous samples is around 2% in mass, but the weight used for the measurements is very low around 10 mg), the test is very sensitive to homogeneity. TGA was only performed on some selected samples for better understanding of the fire retardance behaviour.

Hot Set Test: The Hot Set Test was performed according to the IEC 60811 specification. A 0.2 MPa/mm$^2$ force is applied to a dumbbell specimen in an oven at 200° C. for 15 min, after which, the elongation under load is read. Then, the constraint is removed and the samples are kept in the oven for another five minutes before being cooled to room temperature. On the cooled sample, the recovery length is read. Three samples from each reference are tested. The deviation is within 9%.

LOI: The apparatus used is a LOI from FTT Co., UK in accordance with ISO 4589/ASTM D2863. This test of flammability involves measuring the minimum concentration of oxygen in a mix oxygen/nitrogen which allows maintaining combustion of the vertical test-sample.

UL94, cone calorimeter and electrical measurements: The other method to evaluate the flame retardancy of materials is UL 94 Flammability standard by Underwriters Laboratories, USA. UL-94 test was performed using a flammability chamber of CEAST Co., Italy, in accordance with ASTM D 635 for horizontal and ASTM D 3801 for vertical test positions. The standard classifies plastics according to how they burn in various orientations and thicknesses. From lowest (least flame-retardant) to highest (most flame-retardant), the classifications are:

HB: slow burning on a horizontal specimen; burning rate<76 mm/min for thickness<3 mm.

V2: burning stops within 30 seconds on a vertical specimen; drips of flaming particles are allowed.

V1: burning stops within 30 seconds on a vertical specimen; no drips allowed.

V0: burning stops within 10 seconds on a vertical specimen; no drips allowed.

Cone calorimeter Test (CCT): Performed using Cone calorimeter of Fire Testing Technology Limited (Incorporating Stanton Redcroft), UK. The heat release, weight loss as well as smoke, CO and $CO_2$ production were measured in accordance with ASTM 1354-04 under the heat flux of 50 kW/m², which corresponds to the heat evolved during the burning of the samples. The parameters of flammability characterization include heat release rate (HRR), time to ignition (IT), specific extinction area (SEA), etc. Peak of heat released rate (PHHR) is considered as the parameter which best expresses the maximum intensity of a fire indicating the rate and extent of fire spread. Time to ignition (TTI) and the fire performance index (FPI) defined as the ratio of TTI and PHRR that is a parameter related with the time available to escape in a real fire situation. The following examples further illustrate the present invention

Examples 01-10

Formulations were made into sheets according to the procedure outlined below for the various characterizations. The standards used in various tests are as follows:
Tensile strength and elongation at break at 25° C.: NFT 51.034
Hot Set Test (0.2 MPa/mm² at 200° C. for 15 minutes): IEC 60811
Heat aging at 135° C. for 7 days
Retention of tensile strength and elongation at break: NFT 51.034
LOI: ASTM D 2863
UL 94: ASTM D 3801

TABLE 2B

| | Example | | | | | | | | | |
|---|---|---|---|---|---|---|---|---|---|---|
| | 01 | 02 | 03 | 04 | 05 | 06 | 07 | 08 | 09 | 10 |
| EVA 360 | 90 | 90 | 90 | 90 | 90 | 90 | 90 | 90 | 90 | 90 |
| LLDPE 118 W | 6 | 10 | 10 | 10 | 10 | 10 | 10 | 6 | 6 | 6 |
| LLDPEgMA (Fusabond ®) | 4 | | | | | | | 4 | | 4 |
| PEgMA Priex ® 11006 | | | | | | | | | 4 | |
| Naugard Q | 1.5 | 1.5 | 1.5 | 1.5 | 1.5 | 1.5 | 1.5 | 1.5 | 1.5 | 1.5 |
| Magnifin ® MH-10A | 70 | 60 | 70 | 60 | 55 | 50 | 70 | 70 | 70 | 70 |
| Ultracarb ® LH15X | 65 | 65 | 65 | 65 | 65 | 65 | 65 | 65 | 65 | 65 |
| Charmax ® AOM | | 9 | 2 | 9 | 9 | 9 | 2 | 2 | 2 | |
| Talc V3837 | 2 | 2 | 2 | | | | 2 | 2 | 2 | 2 |
| ZnB | 5 | 5 | 5 | 5 | 5 | 5 | 5 | 5 | 5 | 5 |
| PTFE | | 0.5 | 0.5 | 0.5 | 0.5 | 0.5 | 0.5 | 0.5 | 0.5 | 0.5 |
| Dispersant Z6173 | | | | | | | | 2 | 2 | 2 |
| Dose EB (kGy) | 125 | 125 | 125 | 125 | 125 | 125 | 125 | 125 | 125 | 125 |
| PROPERTIES | | | | | | | | | | |
| Tensile Strength (MPa) | 14.4 | 13.3 | 12.1 | 11.3 | 11.6 | 10.8 | 10.9 | 12.9 | 12.2 | 13.5 |
| Elongation at break (%) | 189 | 233 | 251 | 205 | 264 | 299 | 216 | 208 | 231 | 181 |
| Hot Set Test (%) Air oven aging (7 days at 135° C.) | 58 | 63 | 110 | 133 | 93 | 173 | 498 | 43 | 55 | 48 |
| Retention of Tensile Strength (%) | 108 | 95 | 100 | 120 | 114 | 119 | 111 | 102 | 107 | 104 |
| Retention of Elongation at break (%) | 85 | 88 | 67.7 | 71 | 60 | 61 | 87 | 67 | 71 | 92 |
| UL94 | HB | HB | HB | HB | HB | HB | V1 | HB | V0 | HB |
| LOI | 35.5 | 30.6 | 31.3 | 30.5 | 29.5 | 29.6 | 32.4 | 35 | 35.1 | 36.4 |

More particularly, tests for tensile properties (i.e. tensile strength ad elongation at break), Hot Set Test and retention after thermal ageing were performed and all results exhibited improved physical properties. This is particularly true in respect to example 09. In examples 01 to 10, samples comprising as main fire retardant fillers based on magnesium hydroxide vinyl silane treated and Ultracarb® were tested and the results presented in Table 2B. Working examples 08 to 10 and also example 01 demonstrate the benefit of using a compatibilizer (PEgMA) which allows gaining high LOI of 35.1% with good mechanical properties. Working examples 04 and 05 without talc possess lower LOI than examples 09 or 10. According to the Hot Set Test, working examples 09, 08 or 01 which are with talc are better than working examples without talc such as examples 06 or 04. A mixture of three fire retardants allows reaching the UL94 V0 rating: example 09.

Examples 11-17

Table 3 describes some compositions of the present disclosure; particularly embodiment's exhibit greatly improved physical properties (for instance the role of a functional surface treatment of any metallic hydrate on the mechanical properties).

TABLE 3

| | Example | | | | | | |
|---|---|---|---|---|---|---|---|
| | 11 | 12 | 13 | 14 | 15 | 16 | 17 |
| EVA 360 | 90 | 90 | 90 | 90 | 90 | 90 | 90 |
| LLDPE 118 W | 10 | 10 | 10 | 10 | 10 | 10 | 10 |
| Naugard ® Q | 1.5 | 1.5 | 1.5 | 1.5 | 1.5 | 1.5 | 1.5 |
| Magnifin ® MH 10A | 135 | | | 67.5 | 67.5 | | 45 |
| Ultracarb ® LH15X | | 135 | | 67.5 | | 67.5 | 45 |
| KISUMA ® 5B | | | 135 | | 67.5 | 67.5 | 45 |
| Talc V3837 | 2 | 2 | 2 | 2 | 2 | 2 | 2 |
| ZnB | 5 | 5 | 5 | 5 | 5 | 5 | 5 |
| Dose EB (kGy) | 125 | 125 | 125 | 125 | 125 | 125 | 125 |
| PROPERTIES | | | | | | | |
| Tensile Strength (MPa) | 17.5 | 9 | 13.3 | 13.6 | 10.8 | 12.4 | 12 |
| Elongation at break (%) | 173 | 124 | 531 | 531 | 221 | 513 | 358 |
| Hot Set Test (%) | 35 | 238 | 120 | 63 | 55 | 133 | 98 |
| Air oven aging (7 days at 135° C.) | | | | | | | |
| Retention of Tensile Strength (%) | 104 | 116 | 72 | 103 | 125 | 77 | 105 |
| Retention of Elongation at break (%) | 86 | 89 | 26 | 71 | 73 | 33 | 50 |
| UL94 | HB | HB | HB | HB | HB | HB | HB |
| LOI (%) | 30.9 | 32.9 | 35.3 | 35.1 | 35 | 36.3 | 35.8 |

Working examples 11-17 demonstrate the role of fire retardants. Using Magnifin® MH 10A alone gives higher tensile strength than using Kisuma® 5B. On the other hand, Kisuma® gives higher elongation at break of 531% than Ultracarb® or Magnifin® MH 10A. Table 3 demonstrates the improved properties produced as the result of incorporation of the partially hydrated magnesium calcium carbonate, sold under the name of Ultracarb® in association with the di-hydroxide magnesium named Magnifin®. Thus, the improved compositions of the present invention exhibit not only enhanced physical properties, but also improved thermal ageing properties and fire or flame retardance properties. In the same way, data for Hot Set Test are influenced by the nature of these metallic hydrates. Optimum values of 60% were obtained with a mixture of 67.5/67.5 of Magnifin® MH10A and Ultracarb®. Working example 16 with Kisuma® 5B in replacement of Magnifin® MH 10A gave a high value for LOI but a very bad retention of elongation at break after thermal ageing.

Examples 18-21 Versus 09

TABLE 4

| Example | 18 | 19 | 20 | 21 | 09 |
|---|---|---|---|---|---|
| EVA 360 | 90 | 90 | 90 | 90 | 90 |
| LLDPE 118W | 10 | 10 | 10 | 10 | 6 |
| PEgMA Priex 11006 | | | | | 4 |
| Naugard ® Q | 1.5 | 1.5 | 1.5 | 1.5 | 1.5 |
| Magnifin ® MH | 70 | 60 | 55 | 50 | 70 |
| Ultracarb ® LH15X | 65 | 65 | 65 | 65 | 65 |
| Charmax ®AOM | 2 | 9 | 9 | 9 | 2 |
| Talc V3837 | 2 | | | | 2 |
| ZnB | 5 | 5 | 5 | 5 | 5 |
| PTFE | 0.5 | 0.5 | 0.5 | 0.5 | 0.5 |
| Dispersant Z6173 | | | | | 2 |
| Dose EB (kGy) | 125 | 125 | 125 | 125 | 125 |
| PROPERTIES | | | | | |
| Tensile Strength (MPa) | 12.1 | 11.3 | 11.6 | 10.8 | 12.2 |
| Elongation at break (%) | 251 | 205 | 264 | 299 | 231 |
| Hot Set Test (%) | 110 | 133 | 93 | 173 | 55 |
| Retention of Tensile Strength (%) | 100 | 120 | 114 | 119 | 107 |
| Retention of Elongation at break (%) | 67.7 | 71 | 60 | 61 | 71 |
| UL94 | HB | HB | HB | HB | V0 |
| LOI | 31.3 | 30.5 | 29.5 | 29.6 | 35.1 |

Examples 18, 09 demonstrate the role of talc: higher tensile strength. Examples 20 and 21 versus example 09 demonstrate that higher level in Magnifin® MH 10A leads to lower values for Hot Set Test. Table 4 demonstrates the benefit of using a dispersant Z 6173 sold by Dow Corning to obtain better LOI in comparison to the formulations prepared without this dispersant.

Examples 22-28 Versus 09

Furthermore, in order to more clearly demonstrate the improved properties of the present invention, the incorporation of additional fillers such as a derivative of molybdenum under the trade name of Charmax®; talc, zinc borate were added to the compositions of the invention. Secondly, in order to more clearly demonstrate the improved properties of the present invention, the incorporation of additional fillers such as powder of PTFE and a dispersant under the trade name Z 6173 were added to the compositions of the invention. The resulting formulations were evaluated according to the procedures utilized in previous examples. The results are shown in Table 5.

The addition of Charmax® enhanced the mechanical properties before and after electron beam cross-linking compared to the formulation without this molybdate derivative. In addition, Charmax® assists in reaching the UL94 V0 rating. Talc improves mechanical properties with higher values of tensile strength.

TABLE 5

| | Example | | | | | | | |
|---|---|---|---|---|---|---|---|---|
| | 22 | 23 | 24 | 25 | 26 | 27 | 09 | 28 |
| EVA 360 | 90 | 90 | 90 | 90 | 90 | 90 | 90 | 90 |
| LLDPE 118 W | 6 | 6 | 6 | 6 | 6 | 6 | 6 | 6 |
| PEgMA Priex 11006 | 4 | 4 | 4 | 4 | 4 | 4 | 4 | 4 |
| Naugard Q | 1.5 | 1.5 | 1.5 | 1.5 | 1.5 | 1.5 | 1.5 | 1.5 |
| Magnifin ® MH | 70 | 70 | 70 | 70 | 135 | 0 | 70 | 70 |
| Ultracarb ® LH15X | 65 | 65 | 65 | 65 | 0 | 135 | 65 | 65 |
| Charmax ® AOM | 0 | 2 | 2 | 2 | 2 | 2 | 2 | 2 |
| Talc V3837 | 2 | 0 | 2 | 2 | 2 | 2 | 2 | 2 |
| ZnB | 5 | 5 | 0 | 5 | 5 | 5 | 5 | 5 |
| PTFE | 0.5 | 0.5 | 0.5 | 0 | 0.5 | 0.5 | 0.5 | 0.5 |
| Dispersant Z6173 | 2 | 2 | 2 | 2 | 2 | 2 | 2 | 0 |
| Dose EB (kGy) | 125 | 125 | 125 | 125 | 125 | 125 | 125 | 125 |
| PROPERTIES | | | | | | | | |
| Tensile Strength (MPa) | 13.1 | 12.5 | 12.8 | 12.1 | 17.4 | 9.4 | 12.2 | 13.9 |
| Elongation at break (%) | 231 | 232 | 258 | 253 | 291 | 267 | 231 | 217 |
| Hot Set Test (%) | 60 | 50 | 58 | 65 | 30 | 83 | 55 | 30 |
| Retention of Tensile Strength (%) | 115 | 116 | 110 | 117 | 100.6 | 103.2 | 107 | 101 |
| Retention of Elongation at break (%) | 81 | 85 | 75 | 79 | 63.6 | 35.2 | 71 | 69 |
| UL94 | HB | HB | HB | HB | HB | HB | V0 | HB |
| LOI | 36.4 | 35.5 | 36 | 36.9 | 34 | 33.9 | 35.1 | 32.7 |

TABLE 6

Benefit of various fillers on Hot Set Test values according the dose range in kGy

| | Example | | | | | | | |
|---|---|---|---|---|---|---|---|---|
| | 22 | 23 | 24 | 25 | 26 | 27 | 09 | 28 |
| EVA 360 | 90 | 90 | 90 | 90 | 90 | 90 | 90 | 90 |
| LLDPE 118 W | 6 | 6 | 6 | 6 | 6 | 6 | 6 | 6 |
| PEgMA Priex 11006 | 4 | 4 | 4 | 4 | 4 | 4 | 4 | 4 |
| Naugard Q | 1.5 | 1.5 | 1.5 | 1.5 | 1.5 | 1.5 | 1.5 | 1.5 |
| Magnifin ® MH | 70 | 70 | 70 | 70 | 135 | 0 | 70 | 70 |
| Ultracarb ® LH15X | 65 | 65 | 65 | 65 | 0 | 135 | 65 | 65 |
| Charmax ® AOM | 0 | 2 | 2 | 2 | 2 | 2 | 2 | 2 |
| Talc V3837 | 2 | 0 | 2 | 2 | 2 | 2 | 2 | 2 |
| ZnB | 5 | 5 | 0 | 5 | 5 | 5 | 5 | 5 |
| PTFE | 0.5 | 0.5 | 0.5 | 0 | 0.5 | 0.5 | 0.5 | 0.5 |
| Dispersant Z6173 | 2 | 2 | 2 | 2 | 2 | 2 | 2 | 0 |
| Dose (kGy) | Hot Set Test in % | | | | | | | |
| 75 | FT | 275 | 325 | 485 | 220 | FT | FT | 123 |
| 100 | 155 | 93 | 210 | 148 | 55 | 188 | 90 | 40 |
| 125 | 60 | 50 | 58 | 65 | 30 | 83 | 38 | 30 |

Note:
FT stands for failed test.

Table 6 demonstrates improved Hot Set Test as the result of the incorporation of PTFE powder and zinc borate compared to that of the formulation without zinc borate or without PTFE powder. Particularly formulations which have been cross linked with low dose of 100 kGy demonstrate the role of these additives such as zinc borate and Charmax®: working examples 26 or 28. The current embodiments enable to produce an eco friendly cable and wire composition. The lack of phosphorous and VOC enables reduction of air and soil pollution during fire. Secondly, a compound free of VOC meets all the environmental requirements to prevent soil and air pollution during all the steps from the pre mixing step to compounding (extrusion).

In addition, it will be appreciated that the various compositions, use of eco friendly chemicals, and methods of making a less toxic wire and cable insulation disclosed herein may be embodied using means for achieving the various combinations of chemicals and methods to make them in a cost efficient manner and reduce pollution of air and soil in case of fire or natural disaster. Accordingly, the specification and drawings are to be regarded in an illustrative rather than a restrictive sense.

What is claimed is:

1. A composition comprising:
90 parts by weight of a copolymer, wherein the copolymer is ethylene vinyl acetate;
6 parts by weight of a polymer, wherein the polymer is linear low density polyethylene;
4 parts by weight of a compatibilizer, wherein the compatibilizer is poly(ethylene-co-glycidyl meth-acrylate) (PEGMA);
1.5 parts by weight of thermal stabilizer, wherein the thermal stabilizer is polymerized 1,2-dihydro-2,2,4-trimethylquinoline;
70 parts by weight of a flame retardant; wherein the flame retardant is magnesium hydroxide;
65 parts by weight of a second flame retardant, wherein the second flame retardant is huntite hydromagnesite;
2 parts by weight of a polymer additive group for smoke suppression; wherein the polymer additive group for smoke suppression is ammonium octamolybdate;
2 parts by weight of a talc;
5 parts by weight of a zinc borate;
0.5 parts by weight of a polytetrafluoroethylene;
2 parts by weight of a dispersant, wherein the dispersant is organofunctional siloxane; and
without a cross linking co-agent for cross-linking using an electron beam at a specific absorbed dose.

2. A method, comprising;
blending a thermoplastic composition comprising:
90 parts by weight of a copolymer, wherein the copolymer is ethylene vinyl acetate;
6 parts by weight of a polymer, wherein the polymer is linear low density polyethylene;
4 parts by weight of a compatibilizer, wherein the compatibilizer is poly(ethylene-co-glycidyl meth-acrylate) (PEGMA);
1.5 parts by weight of thermal stabilizer, wherein the thermal stabilizer is polymerized 1,2-dihydro-2,2,4-trimethylquinoline;
70 parts by weight of a flame retardant; wherein the flame retardant is magnesium hydroxide;
65 parts by weight of a second flame retardant, wherein the second flame retardant is huntite hydromagnesite;
2 parts by weight of a polymer additive group for smoke suppression; wherein the polymer additive group for smoke suppression is ammonium octamolybdate;
2 parts by weight of a talc;
5 parts by weight of a zinc borate;
0.5 parts by weight of a polytetrafluoroethylene;
2 parts by weight of a dispersant, wherein the dispersant is organofunctional siloxane; and
cross-linking without a co-agent using an electronic beam.

3. The method as in claim 2, further comprising;
pelletizing the thermoplastic composition;
extruding the pelletized thermoplastic composition; and
irradiating by electron beam to cross-link a thermoplastic extruded composition using a specific adsorbed dose to form a cross-linked thermosetting composition suitable to be used as insulation material for wire and cable.

4. The method as in claim 3, wherein the specific adsorbed dose is between 75 kGy-150 kGy.

5. The method as in claim 4, wherein the specific adsorbed dose is 125 kGy.

6. The method as in claim 5, further comprising;
thermally aging a cross-linked thermosetting composition for seven days in 135° C. temperature under air.

7. A cable comprising:
a wire;
a sheath encompassing the wire, wherein the sheath is blended from a thermoplastic extrudable composition comprising the following components:
90 parts by weight of a copolymer, wherein the copolymer is ethylene vinyl acetate;
6 parts by weight of a polymer, wherein the polymer is linear low density polyethylene;
4 parts by weight of a compatibilizer, wherein the compatibilizer is poly(ethylene-co-glycidyl meth-acrylate) (PEGMA);
1.5 parts by weight of thermal stabilizer, wherein the thermal stabilizer is polymerized 1,2-dihydro-2,2,4-trimethylquinoline;
70 parts by weight of a flame retardant; wherein the flame retardant is magnesium hydroxide;
65 parts by weight of a second flame retardant, wherein the second flame retardant is huntite hydromagnesite;
2 parts by weight of a polymer additive group for smoke suppression; wherein the polymer additive group for smoke suppression is ammonium octamolybdate;
2 parts by weight of a talc;
5 parts by weight of a zinc borate;
0.5 parts by weight of a polytetrafluoroethylene;
2 parts by weight of a dispersant, wherein the dispersant is organofunctional siloxane; and
without a co-agent for cross-linking using an electron beam at a specific absorbed dose.

8. A cable according to claim 7, wherein the sheath is electron beam cross linked the thermoplastic extrudable composition, wherein the sheath is extruded the thermoplastic extrudable composition without a co-agent for cross-linking, and wherein the specific adsorbed dose is between 75 kGy-150 kGy.

* * * * *